United States Patent [19]

Spicer

[11] 4,385,346

[45] May 24, 1983

[54] ORNAMENTAL SNAP-TOGETHER LIGHT FIXTURE

[76] Inventor: Edward Spicer, 11631 Dona Alicia Pl., Studio City, Calif. 91604

[21] Appl. No.: 258,568

[22] Filed: Apr. 29, 1981

[51] Int. Cl.$^3$ .............................................. B60Q 3/04

[52] U.S. Cl. .................................... 362/382; 362/147; 362/249; 362/252; 362/404; 362/806

[58] Field of Search ............... 362/382, 147, 404, 249, 362/252, 806

[56] References Cited

U.S. PATENT DOCUMENTS 1,671,472 5/1928 Green ................................. 362/252

4,032,774 6/1977 Spicer ................................. 362/382

*Primary Examiner*—Stephen J. Lechert, Jr.

*Attorney, Agent, or Firm*—Gene W. Arant

[57] ABSTRACT

An ornamental snap-together light fixture in which spring means associated with a bulb socket not only holds the socket in a metal cup, but also secures the metal cup to a base member. In addition, the metal cup has a circumferential ridge which is spaced a substantial distance from its bottom end, and an ornamental member positioned upon the base member and about the cup is held in place between that ridge and the base member, through indirect action of the spring means of the socket.

4 Claims, 6 Drawing Figures

Fig. 3.
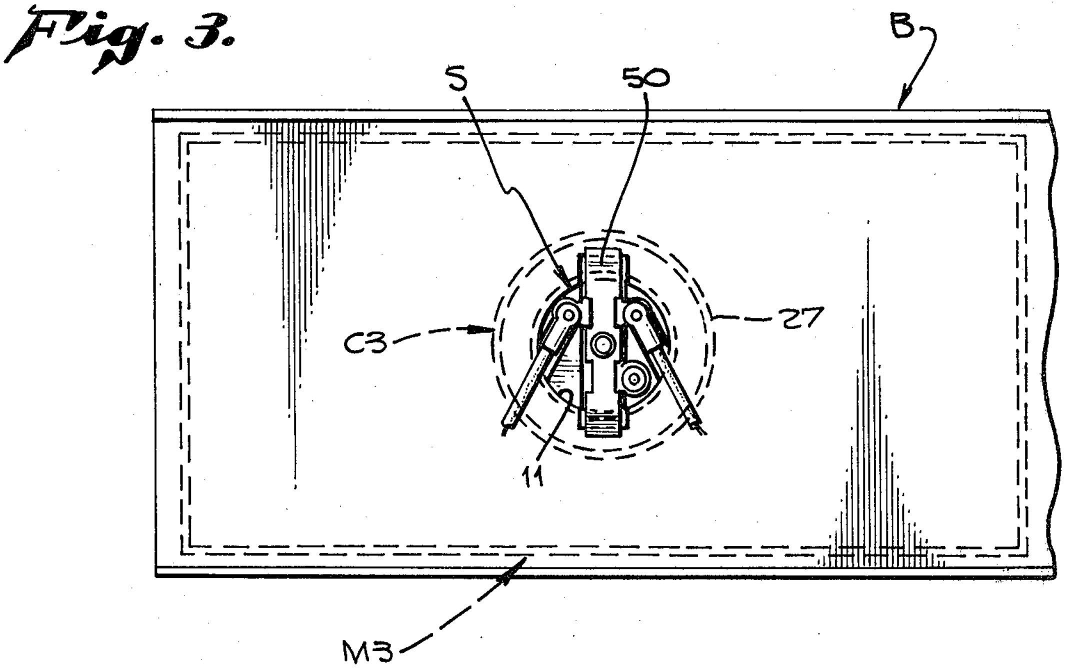
Fig. 4.
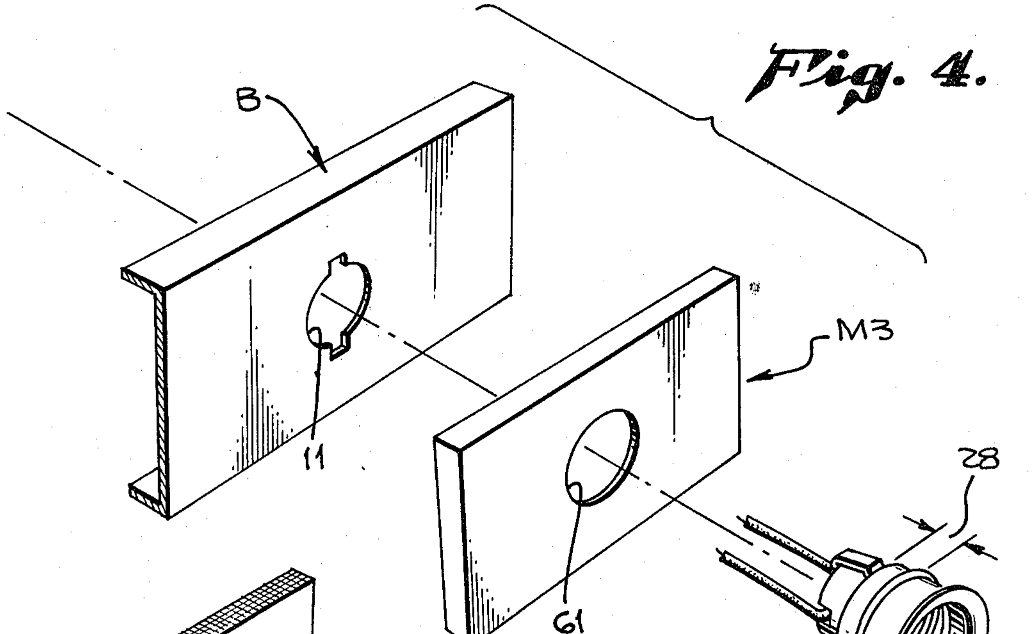
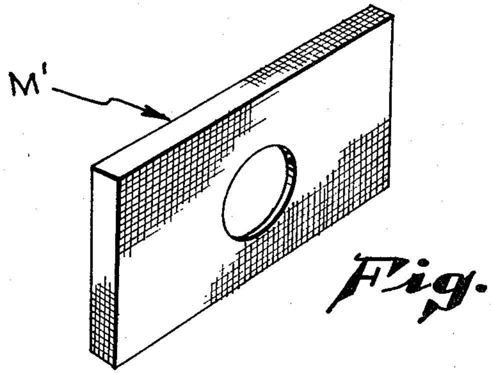
Fig. 5.

ORNAMENTAL SNAP-TOGETHER LIGHT FIXTURE

RELATED PATENT

The present invention is an improvement over that shown in my U.S. Pat. No. 4,032,774 issued June 28, 1977.

BACKGROUND OF THE INVENTION

In the manufacture of lighting fixtures there is a constant need to provide new and different types of ornamental appearance, while at the same time minimizing the cost of manufacture of the product. It is also essential to have a product that is easy to assemble and install and which is reliable in operation.

DRAWING SUMMARY

FIG. 3 is an underneath view of the mechanism taken on the line 3—3 of FIG. 2;

FIG. 4 is an exploded perspective view of the mechanism shown in FIGS. 2 and 3;

FIG. 5 is a perspective view of an alternate construction of the flat ornamental member.

DETAILED DESCRIPTION

Figure 1:
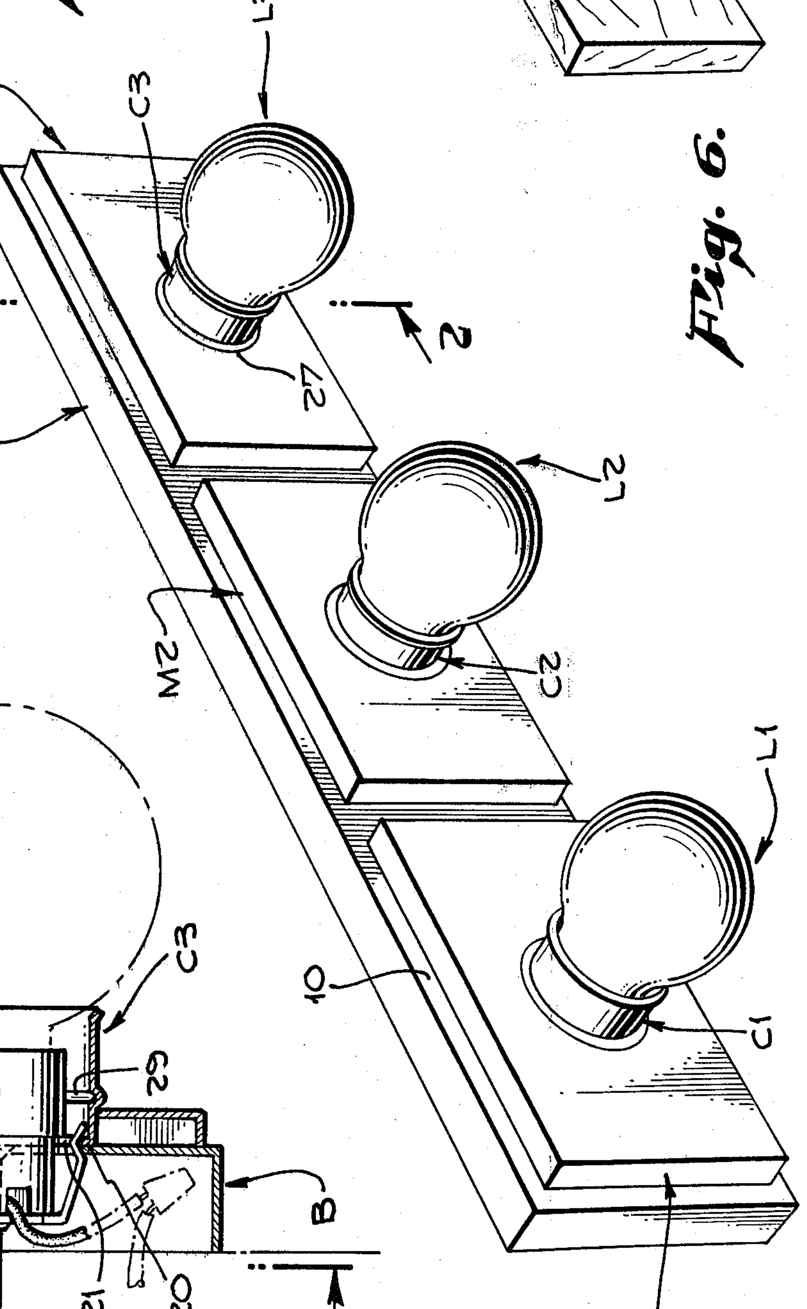
FIG. 1 is a perspective view of one embodiment of my invention incorporating three light bulbs.

FIG. 1 shows an ornamental light fixture F having an elongated base B. The fixture supports three light bulbs L1, L2, and L3. Each of the light bulbs has its base end received in a corresponding metal cup C1, C2, or C3 which is in turn supported from the base member B. An ornamental member M surrounds each metal cup and is supported on the front wall 10 of base member B. Specifically, ornamental member M1 surrounds cup C1 which members M2 and M3 surround the cups C2 and C3, respectively.

Figure 2:
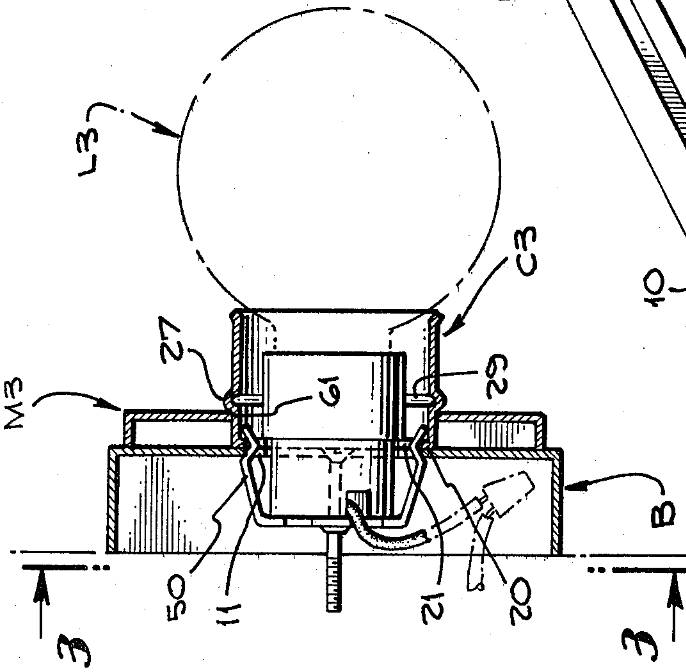
FIG. 2 is a cross-sectional view taken on line 2—2 of FIG. 1 and showing the interior mechanism for supporting one of the light bulbs.

FIGS. 2, 3 and 4 show the structural details of metal cup C3 and ornamental member M3. Base member B is in the form of a hollow metal tray adapted to fit against a wall or ceiling. Metal cup C3 has a bottom wall 20 which engages the exposed outer surface of base member B. The outer wall of base member B has an opening 11 formed in it, while bottom wall 20 of cup C3 has an opening 21, and these two openings are aligned and are substantially congruent.

A bulb socket S is disposed inside the metal cup C3 for receiving the base end of the bulb L3. Socket S extends through both of the openings 21 and 11. Included as part of the socket S is a spring steel strip 50 which holds the socket in place. Specifically, the hooked ends of the strap 50 engage the edges of both of the openings 11, 21, so as to releasably hold the base member B, metal cup C3, and socket S together. This arrangement of the parts was disclosed and claimed in my above referenced prior patent.

A novel feature of the present invention is a circumferential ridge 27 that is formed in the otherwise cylindrical wall of the metal cup C3. The wall of the cup is of substantially uniform thickness, hence a circumferential groove 29 is also formed on the interior side of the wall, opposite the ridge 27. The circumferential ridge 27 is located a substantial distance away from the bottom wall 20 of the cup, this distance being indicated at numeral 28 in FIG. 4.

Ornamental member M3, in the embodiment of FIGS. 1–4, is in the form of a thin-walled metallic member having downturned edges. That is, it is essentially in the form of an inverted tray, the same as base member B.

Ornamental member M3 has a thickness which corresponds to the distance 28. Member M3 also has an opening which is larger in diameter than the aligned openings 11, 21 of the base member and metal cup. More specifically, the diameter of the opening 61 of ornamental member M3 is such as to conform to the external diameter of the metal cup C3.

Ornamental member M3 is positioned upon base member B and about the cup C3, with the bottom part of the cup being received within opening 61. The circumferential ridge 27 of the cup, therefore, bears against the outer surface of the ornamental member M3. This arrangement ensures that the ornamental member M3 is retained in position upon the base member B.

Thus it will be apparent that the spring means 50 is responsible for directly holding together both the cup C3 and base member B, while securing the socket S in place relative to those members. At the same time, indirectly, it is responsible for holding the ornamental member M3 in place.

FIG. 5 shows an ornamental member M' which is made as a single piece of plastic material having a substantially uniform thickness throughout.

Figure 6:
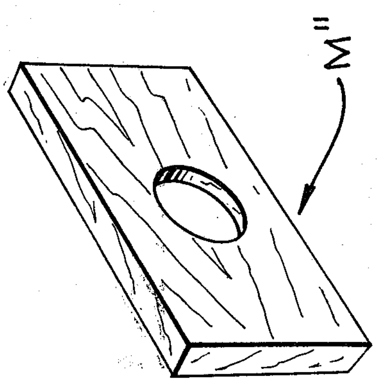
FIG. 6 is a perspective view showing another alternate construction of the flat ornamental member.

FIG. 6 shows an ornamental member M" which is made as a single piece of wood having a substantially uniform thickness throughout.

While the ornamental members M are shown as being of rectangular configuration, it will of course be understood that they may be made of hexagonal, square, round, or other configuration as may be desired.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An ornamental snap-together light fixture comprising:
   - a base member adapted to fit upon a wall or ceiling;
   - a metal cup for receiving and enclosing a bulb socket, said cup having a bottom wall which engages said base member, said base member and said cup bottom wall having aligned openings for receiving a bulb socket;
   - a bulb socket disposed within said metal cup and extending through said openings, said bulb socket having associated spring means which releasably grasps the edges of said openings for holding all three of said parts together;
   - said metal cup having a substantially uniform wall thickness throughout, having formed thereon a circumferential ridge spaced a substantial distance from said bottom wall, and having a circumferential groove formed on its inner wall opposite said ridge; and
   - a flat ornamental member whose thickness corresponds to said substantial distance, said member being positioned on said base member about said cup, and having an opening which is larger in diameter than said aligned openings of said base member and said cup bottom wall and which conforms to and receives the bottom part of said cup so that said ridge retains said ornamental member in position on said base member.

2. An ornamental light fixture as in claim 1 wherein said flat ornamental member is a single piece of wood having uniform thickness throughout.

3. An ornamental light fixture as in claim 1 wherein said flat ornamental member is a single piece of plastic material having uniform thickness throughout.

4. An ornamental light fixture as in claim 1 wherein said flat ornamental member is formed of a thin sheet of metal having downturned edges to provide a hollow interior area.

* * * * *